United States Patent [19]

Yamada et al.

[11] Patent Number: 5,768,690
[45] Date of Patent: Jun. 16, 1998

[54] RADIO COMMUNICATION DEVICE WITH IMPROVED ANTENNA DUPLEXING APPARATUS

[75] Inventors: Tatsuya Yamada, Hino; Kyuichiro Aihara, Hachioji, both of Japan

[73] Assignee: Kabushiki Kaisha Toshiba, Kawasaki, Japan

[21] Appl. No.: 541,581

[22] Filed: Oct. 10, 1995

[30] Foreign Application Priority Data

Oct. 11, 1994 [JP] Japan ................... 6-245478

[51] Int. Cl.$^6$ ........................... H04B 1/44
[52] U.S. Cl. ................. 455/78; 455/83; 455/117; 455/296; 333/1.1
[58] Field of Search ................. 455/78, 80, 81, 455/82, 83, 50.1, 63, 114, 117, 129, 269, 296, 249.1, 501; 333/1.1, 100, 101, 104, 136

[56] References Cited

U.S. PATENT DOCUMENTS

| | | | |
|---|---|---|---|
| 2,890,328 | 6/1959 | Fox | 333/1.1 |
| 3,614,675 | 10/1971 | Konishi | 333/1.1 |
| 3,648,197 | 3/1972 | Siekanowicz | 333/1.1 |
| 5,126,703 | 6/1992 | Kosuga | 455/249.1 |
| 5,276,914 | 1/1994 | Ishizuka et al. | 455/83 |
| 5,548,239 | 8/1996 | Kohama | 455/83 |

FOREIGN PATENT DOCUMENTS 62-88443  4/1987  Japan ................... 455/78

OTHER PUBLICATIONS

Johnson et al., Basic Electric Circuit Analysis, 3rd Edition 1986, pp. 462–471.

Huelsman, Lawrence, Basic Circuit Theory, 2nd Edition 1984, pp. 324–326.

*Primary Examiner*—Nguyen Vo
*Assistant Examiner*—Doris To
*Attorney, Agent, or Firm*—Finnegan, Henderson, Farabow, Garrett & Dunner, L.L.P.

[57] ABSTRACT

A radio communication device that performs time-sharing communication by switching between reception and transmission, comprises a circulator for guiding transmission signals to the antenna and reception signals from the antenna to the reception circuit. The output on the reception circuit side of the circulator is grounded via a terminal circuit which is operated during transmission and turned off during reception.

9 Claims, 6 Drawing Sheets

RADIO COMMUNICATION DEVICE WITH IMPROVED ANTENNA DUPLEXING APPARATUS

BACKGROUND OF THE INVENTION

1. Field of the Invention

The present invention relates to a radio communication device, and more particularly to antenna duplexing means in a radio communication device during transmission and reception.

2. Description of the Related Art

Figure 6:
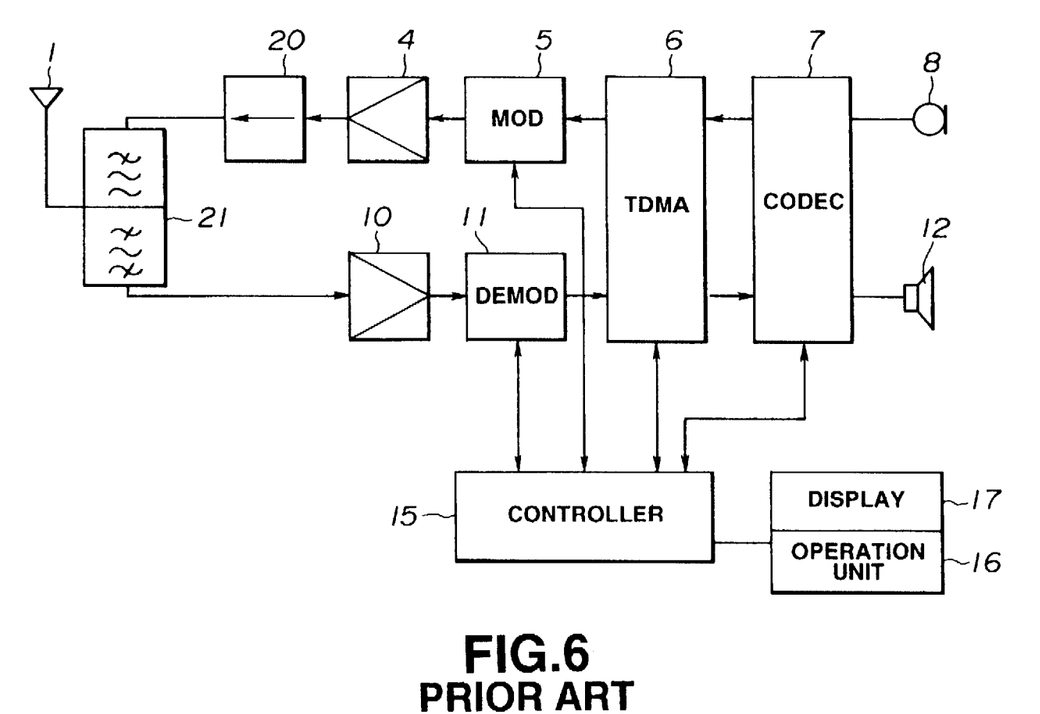
FIG. 6 is a block diagram of a conventional radio communication device (mobile station of a digital mobile communication device)

FIG. 6 is a block diagram of a conventional mobile station of a digital mobile communication device such as the handset of a cordless telephone.

In FIG. 6, the mobile station comprises an antenna 1 used for both transmission and reception, a transmission side power amplifier 4, a modulator 5, a TDMA circuit 6, a CODEC 7, a microphone 8, a reception circuit amplifier 10, a demodulator 11, a speaker 12, a controller 15, an operation unit 16, a display unit 17, an isolator 20, and a duplexer 21.

On the receiving side of this circuit, a radio reception signal from a base station received by the antenna 1 is input via the duplexer 21, amplified by the reception circuit amplifier 10, and demodulated by the demodulator 11 from π/4 shift QPSK or other such modulation, for example, into a base band signal, the self slot portion is taken out by the TDMA circuit 6, decoding such as ADPCM decoding, PCM decoding, or the like is performed from the digital signal of the self slot by the CODEC 7 to decode from a digital signal to an analog voice signal, and a voice signal is sounded from the speaker 12 (earpiece).

On the transmitting side, the voice signal from the microphone 8 (mouthpiece) is converted into a digital signal through encoding by the CODEC 7, such as PCM encoding or ADPCM encoding, this encoded digital signal is placed in the self slot of the TDMA signal by the TDMA circuit 6, and this is modulated by the modulation unit 5 to π/4 shift QPSK or the like and amplified by the power amplifier 4, after which it is sent out from the antenna 1 via the duplexer 21.

The controller 15 comprises a microprocessor or the like and performs the control of the overall device, while the operation unit 16 performs device operation, such as key dialing. The display unit 17 displays information required for communication, dialed numbers, and so on.

The isolator 20 is used to protect the power amplifier 4 and to suppress changes in the load impedance, while the duplexer 21 is intended to function as a distributor that distributes transmitted and received waves, and to function as a filter that removes unnecessary waves.

The problem encountered when such a structure is employed is that considerable loss results from interposing the duplexer 21 and the isolator 20 between the power amplifier 4 and the antenna 1 in the transmission circuit. If, with this configuration, the loss after the power amplifier 4 is great, the output level of the power amplifier 4 will have to be increased correspondingly, which means that more current will be consumed and the power amplifying elements will be bulkier, among other problems, and this goes against the need for making radio devices more compact.

The use of an antenna switch is the method that has been used in the past in order to solve this problem.

Figure 7:
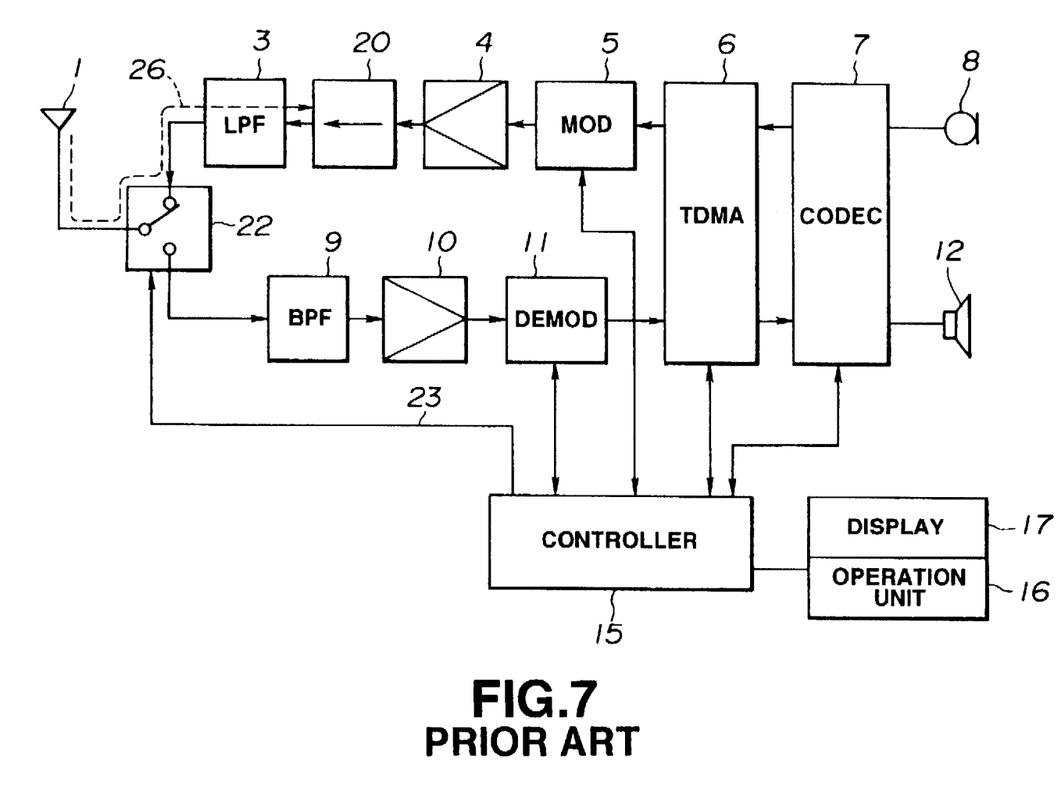
FIG. 7 is a block diagram of another conventional radio communication device (mobile station of a digital mobile communication device).

FIG. 7 is a block diagram of another conventional mobile station of a digital mobile communication device, such as the handset of a cordless telephone, in which this method is used.

In FIG. 7, the mobile station comprises an antenna 1 used for both transmission and reception, a low pass filter 3, a transmission side power amplifier 4, a modulator 5, a TDMA circuit 6, a CODEC 7, a microphone 8, a band pass filter 9, a reception circuit amplifier 10, a demodulator 11, a speaker 12, a controller 15, an operation unit 16, a display unit 17, an isolator 20 and an antenna switch 22. Reference numeral 23 represents a switching control signal. The isolator 20 is used to protect the power amplifier 4 and suppress changes in the load impedance, and to attenuate the reflected wave 26 of the transmission wave from the antenna 1.

In this mobile station, the antenna switch 22 is used instead of the duplexer 21 used in the example in FIG. 6, and switching control is performed using the switching control signal 23 so that the antenna switch 22 will turn ON (to the transmission side) only during transmission. With this setup, the low pass filter 3, which removes the high-frequency component, should be inserted instead of the duplexer 21, which has a large loss, on the transmission side, which allows the loss in the pass band to be reduced.

However, the issue with this method is the performances of the antenna switch 22. Unless the antenna switch 22 has excellent performances comprising low distortion and little leakage current, speech quality will suffer. A switch with excellent distortion characteristics, however, makes the device that much more costly, and the element size is also larger. Consequently, this goes against the need for making the device more compact and less expensive.

As discussed above, problems encountered with conventional radio communication device involving the use of an antenna duplexer included increased current consumption and bulkier power amplification elements. Also, when an antenna switch was used, the switch needed to have excellent strain characteristics and leakage characteristics, and therefore became correspondingly more expensive and the element size increased. In either case, the power consumption increased and the device became bulkier and more expensive, so there were numerous disadvantages in terms of a portable radio communication device.

SUMMARY OF THE INVENTION

In light of the above-discussed points, an object of the present invention is to provide a compact radio communication device that is inexpensive and has low power consumption having an improved antenna duplexing device.

In order to achieve the stated object, a radio communication device of the present invention comprises a transmission/reception circuit and antenna means used for both transmitting and receiving, which comprises circulator means for guiding the transmission signal from the transmission/reception circuit to the antenna means, and for guiding the reception signal from the transmission/reception circuit to the antenna means, and with terminal means provided to the output on the reception circuit side of the circulator means, for terminating to the ground side the reflected wave of the transmission signal reflected by the antenna means.

The terminal means performs a terminating operation only during transmission by the transmission/reception circuit, and comprises switching means and terminal impedance means.

The terminal impedance means may comprise a resistance element. Alternatively, the terminal impedance means may comprise a capacity element or a serial resonance circuit which consists of a serial circuit of impedance elements and capacity elements or a parallel resonance element which consists of a parallel circuit of resistance elements and capacity elements.

The switching means may comprise a semiconductor element.

A radio communication device of another aspect of the present invention comprises a transmission circuit that includes a transmission power amplification means; a reception circuit; control means for controlling the transmission circuit and the reception circuit; antenna means used for both transmitting and receiving; low pass filter means for removing the high-frequency component from the output wave of the transmission power amplification means; circulator means for guiding the transmission signal from the low pass filter means to the antenna means and the reception signal from the antenna means to the reception circuit; and terminal means for terminating to the ground side the reflected wave of the transmission signals reflected by the antenna means.

The terminal means performs a terminating operation only during transmission by the transmission/reception circuit.

With the above construction, the antenna duplexing circuit can be made more compact and less expensive and will use less power, which allows a radio communication device of low power consumption, a low cost, and a compact size to be offered.

DESCRIPTION OF THE PREFERRED EMBODIMENTS

The embodiments of the present invention will now be described while referring to the accompanying drawings.

Figure 1:
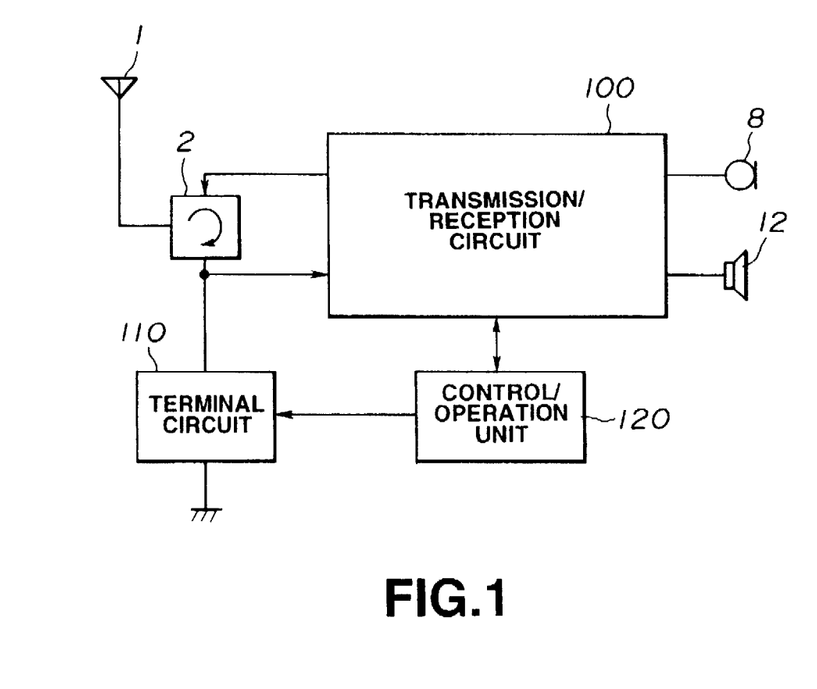
FIG. 1 is a basic block diagram of a radio communication device in one embodiment of the present invention.

Referring to FIG. 1, a radio communication device in one embodiment of the present invention comprises an antenna 1, a circulator 2, a microphone 8, a speaker 12, a transmission/reception circuit 100, a terminal circuit 110 and a control/operation unit 120.

This device is designed such that communication is accomplished by switching between transmission and reception. During transmission, the transmission signal from the transmission/reception circuit 100 is transmitted via the circulator 2 from the antenna 1, and during reception the reception wave received by the antenna 1 is input via the circulator 2 to the transmission/reception circuit 100.

The switching between transmission and reception may, for example, be performed by manual switching, or may be performed by means of a synchronization signal contained in the reception signal, or may be performed by means of a self-excitation switching clock, or the like.

The function of the circulator 2 is to ensure that the transmission signal from the transmission/reception circuit 100 will be sent only to the antenna 1 and will not head directly toward the reception side, and to ensure that the reception signal from the antenna 1 will be sent only to the reception side and will not head directly toward the transmission side.

However, this function of the circulator 2 allows the reflected wave of the reception wave reflected by the antenna 1 during transmission to pass to the reception side, which causes echoing and the like.

With the present invention, this effect can be negated by providing the terminal circuit 110 to the reception side of the circulator 2, and having the terminal circuit 110 operate during transmission so that the reflected waves of the reception waves are short-circuited to the ground side.

When a structure such as this is adopted, the loss interposed between the antenna 1 and the transmission/reception circuit 100 on the reception side is limited to the circulator 2, which allows such problems as increased current consumption to be prevented and also makes the circuit structure relatively simple, so there is no need to use high-performance elements and the circuit can be made more compact and less expensive.

A more specific example will be described through FIGS. 2 and on.

Figure 2:
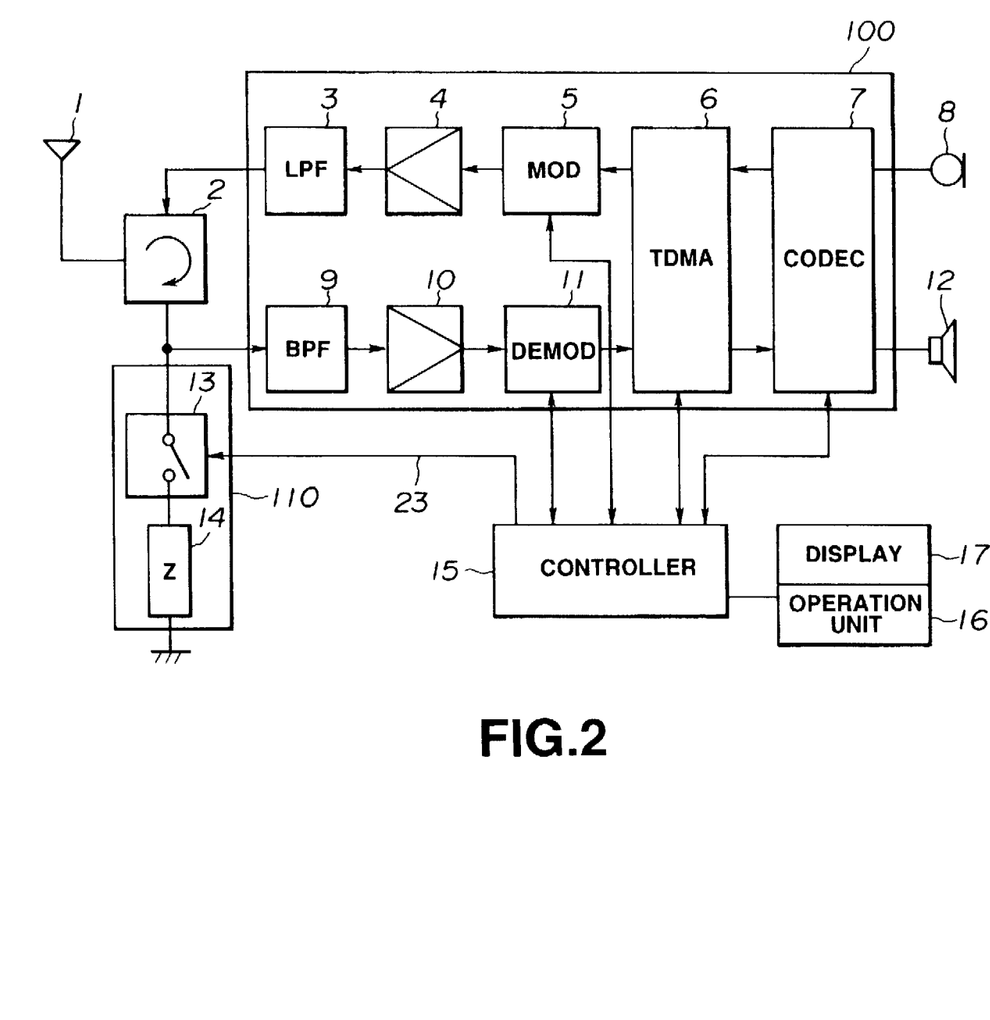
FIG. 2 is a block diagram of the radio communication device (mobile station of a digital mobile communication device) in one embodiment of the present invention.
Figure 3:
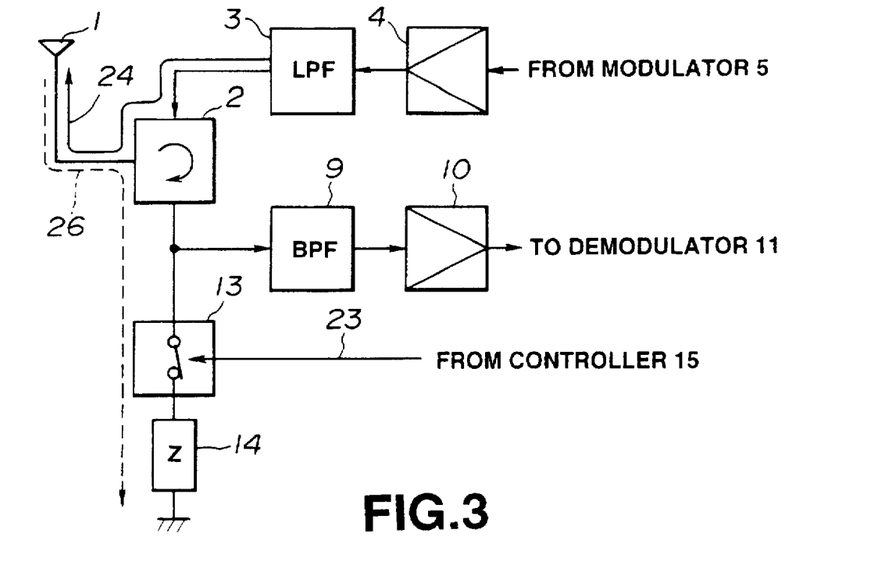
FIG. 3 is an explanatory diagram illustrating the flow of signals during transmission in the embodiment in FIG. 2.
Figure 4:
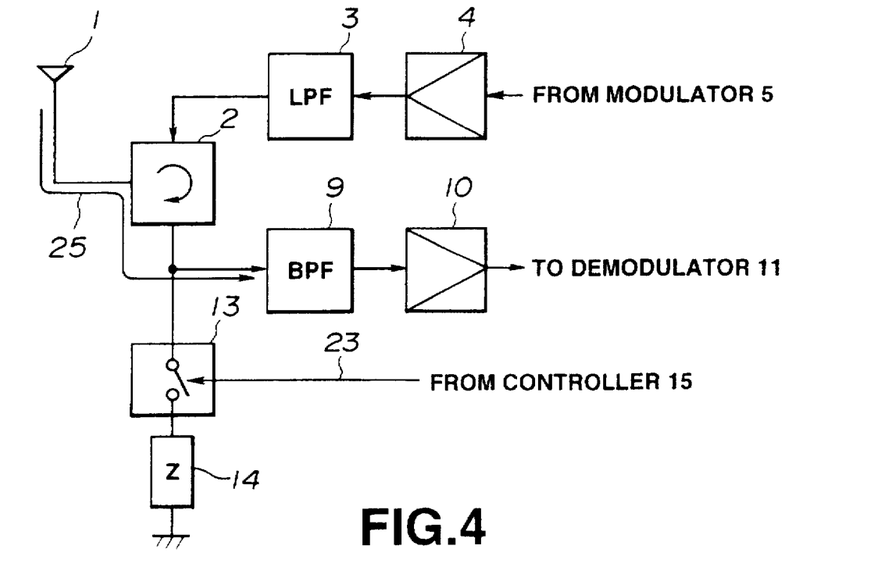
FIG. 4 is a block diagram illustrating the flow of signals during reception in the embodiment in FIG. 2.

FIG. 2 is a block diagram of the mobile station of a digital mobile communication device, such as the handset of a cordless telephone, in one embodiment of the present invention. FIGS. 3 and 4 are diagrams that explain the operation of this circuit. For the sake of simplicity, only the first stage portion of FIG. 2 is shown.

In FIG. 2, the mobile station comprises an antenna 1, a circulator 2, a low pass filter 3, a transmission side power amplifier 4, a modulator 5, a TDMA circuit 6, a CODEC 7, a microphone 8, a band pass filter 9, a reception circuit amplifier 10, a demodulator 11, a speaker 12, a switching means 13, a terminal impedance (Z) 14, a controller 15, an operation unit 16, a display unit 17.

The transmission/reception circuit 100 in FIG. 1 is made up of the low pass filter 3, the power amplifier 4, the modulation unit 5, the TDMA circuit 6, the CODEC 7, the band pass filter 9, the amplifier 10, and the demodulator 11; the terminal circuit 110 in FIG. 1 is made up of the switching means 13 and the terminal impedance 14; and the control/operation unit 120 is made up of the controller 15, the operation unit 16, and the display unit 17.

In FIGS. 2, 3 and 4, 23 is a switching control signal, 24 is a transmission wave, 25 is a reception wave, and 26 is the reflected wave of the transmission wave 24 reflected by the antenna.

To facilitate explanation, those blocks in FIGS. 2, 3, and 4 having the same function as the blocks in FIGS. 6 and 7 are labelled with the same numbers.

The operation of the circuit will be described through reference to these figures.

In this embodiment, the controller 15 switches the device between transmission and reception based on a synchronization signal contained in the reception wave.

In the case of transmission, the voice signal from the microphone 8 (the mouthpiece) is encoded (such as PCM encoding or ADPCM encoding) by the CODEC 7 and converted into a digital signal. The encoded digital signal is placed in the self slot of the TDMA signal in the TDMA circuit 6, and is modulated by the modulation unit 5 to π/4 shift QPSK or the like, yielding the transmission wave 24.

The transmission wave 24 is amplified by the power amplifier 4, and is transmitted from the antenna 1 after going through the circulator 2 and the low pass filter 3, where the noise component used for transmission frequency is removed.

The function of the circulator 2 is to ensure that the transmission signal from the low pass filter 3 will be sent only to the antenna 1 and will not head toward the reception side, and to ensure that the reception signal from the antenna 1 will be sent only to the reception side and will not head toward the transmission side.

The transmission side low pass filter 3 can consist of a lower-order low pass filter that is used for the purpose of removing higher frequencies. In this example, the loss of the circulator 2 is roughly equal to that of the isolator 20 in the conventional radio communication device, while the loss in the pass band of the lower-order low pass filter 3 is smaller than that of the duplexer 21 used in the conventional radio communication device. Therefore, the difference between the loss of the low pass filter 3 and the loss of the duplexer 21 is the amount of improvement in loss in the transmission circuit.

The reflected wave 26 of the transmission wave 24 reflected by the antenna 1 during transmission tries to go through the circulator 2 and around to the band pass filter 9 on the reception side. This band pass filter 9 is designed such that it will select the reception frequency, and there will be high impedance with respect to a transmission frequency. The component of the reflected wave 26 of the transmission wave that still leaks and goes around to the reception side is absorbed by the terminal impedance 14 through switch control by means of the switching control signal 23 such that the switch 13 is on during transmission corresponding to burst operation, and is off during non-transmission. The switching control signal 23 is produced by the controller 15 in synchronization with the carrier synchronization and clock synchronization preamble portion of the reception signal received by the demodulator 11 of the reception circuit.

FIG. 3 shows a case in which the switch 13 is on during transmission.

In this case, the reflected wave 26 from the antenna 1 of the transmission wave 24 goes through the circulator 2 and the switch 13 and is absorbed by the terminal impedance 14. Since the sole purpose of the switch 3 is to guide the reflected wave 26 to the terminal impedance 14, its strain characteristics and leakage characteristics do not need to be outstanding, and it only need be compact and inexpensive.

FIG. 4 shows a case in which the switch 13 is off during reception.

In this case, the reception wave 25 is connected from the antenna 1 to the reception circuit through the circulator 2 and the band pass filter 9. At this point the switch 13 is set to its off position by the control signal 23, so the terminal impedance 14 has no adverse effect on the reception circuit.

The processing of the signal that is input to the reception circuit through the circulator 2 and the band pass filter 9 during reception is the same as in the conventional radio communication device, in which the signal is amplified by the reception circuit amplifier 10 and demodulated by the demodulator 11 from 4π shift QPSK or the like, decoding (such as ADPCM decoding or PCM decoding) from the demodulated digital signal is performed by the CODEC 7 so that an analog voice signal is decoded from the digital signal, and a voice signal is emitted from the speaker 12 (the earpiece).

The above procedure allows the loss starting at the power amplifier 4 to be reduced relatively inexpensively and without the circuit being made any larger, and there is no danger of the transmission wave being reflected by the antenna 1 during transmission and having an adverse effect on the reception side.

The switch 13 used in this embodiment is an on/off switch with two terminals (SPST), and is not a contact switch with three terminals (SPDT) such as 22 in FIG. 7 used in the conventional radio communication device. Therefore, the circuit structure can be greatly simplified from this aspect as well.

Figure 5:
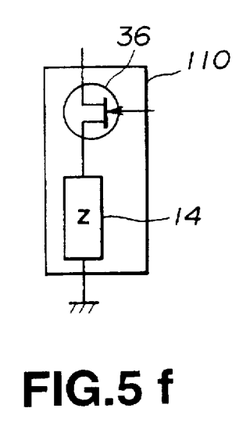
FIGS. 5a through 5f are examples of terminal means used in the present invention.
Figure 5A:
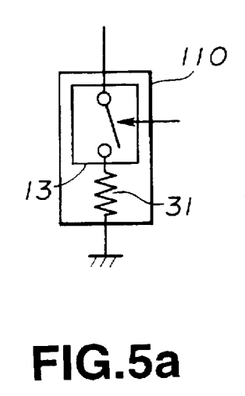
Figure 5B:
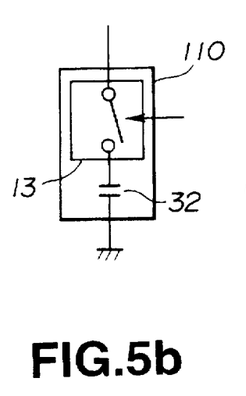
Figure 5C:
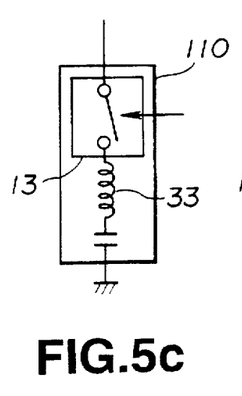
Figure 5D:
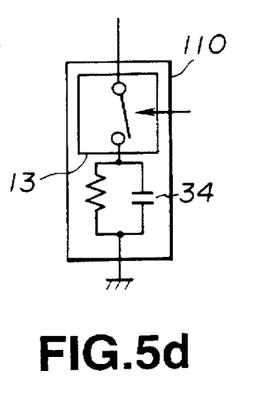

FIGS. 5a through 5d are specific examples of the terminal impedance 14 of the terminal circuit 110. FIG. 5a is an example in which a resistor 31 is used as the terminal impedance 14. FIG. 5b is an example in which a capacitor 32 is used as the terminal impedance 14, in which case the direct current balance on the reception side of the circulator 2 is not lost. FIG. 5c is an example in which a serial resonance circuit 33 is used as the terminal impedance 14; if the resonance frequency of the serial resonance circuit 33 is matched to the frequency of the transmission signal, then even if the characteristics of the switching means 13 are poor and there is power leakage, there will be no flow of the reception wave 25 to the ground side during reception. FIG. 5d is an example in which a parallel resonance circuit is used, which allows the switching response of the terminal circuit 110 to be increased.

Figure 5E:
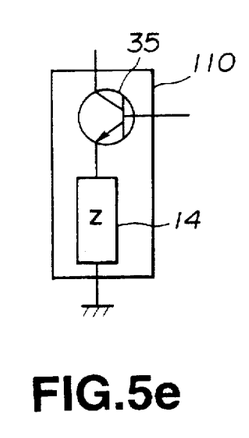

FIGS. 5e and 5f are examples in which a semiconductor element is used as the switching means 13. A transistor is used in FIG. 5e and an FET transistor is used in FIG. 5f. The switching means 13 can also be a relay or other such mechanical element as long as it is able to respond to the transmitting and receiving switching speed, but since, as mentioned above, the switch 13 does not need to have 5 outstanding strain characteristics or leakage characteristics, a semiconductor element can be used and the device made more compact and less expensive.

What is claimed is:

1. An antenna duplexing apparatus for a radio communication device which provides transmission and reception, comprising:

antenna means for use in both transmission and reception;

transmitter means for generating a transmission signal to be transmitted through the antenna means;

receiver means for receiving a reception signal received through the antenna means;

circulator means, connected to the receiver means during both transmission and reception, for guiding the transmission signal generated by the transmitter means to the antenna means, and for guiding the reception signal received by the antenna means to the receiver means;

control means for controlling the transmitter means and the receiver means; and terminal means connected between a connection point of the circulator means to the receiver means and the ground, for terminating at the ground the transmission signal reflected at the antenna means based on control by the control means.

2. An antenna duplexing apparatus for a radio communication device as defined in claim 1, further comprising low-pass filter means connected between the transmitter means and the circulator means, for removing high-frequency components from the transmission signal generated by the transmitter means.

3. An antenna duplexing apparatus for a radio communication device as defined in claim 1, wherein the control means alternatingly controls transmission operations to transmit the transmission signal by the transmitter means and reception operations to receive the reception signal by the receiver means, and wherein the terminal means comprises:

switch means which is connected to a connection point of the circulator means to the receiver means, and is turned on by the control means during control of transmission operations for transmitting the transmission signal from the transmitter means by the control means; and terminal impedance means connected between the switch means and the ground.

4. An antenna duplexing apparatus for a radio communication device as defined in claim 3, wherein the switch means is turned off by the control means during reception operations of the reception signal by the receiver means.

5. An antenna duplexing apparatus for a radio communication device as defined in claim 3, wherein the terminal impedance means comprises a resistance element.

6. An antenna duplexing apparatus for a radio communication device as defined in claim 3, wherein the terminal impedance means comprises a capacitance element.

7. An antenna duplexing apparatus for a radio communication device as defined in claim 3, wherein the terminal impedance means comprises a serial resonance circuit.

8. An antenna duplexing apparatus for a radio communication device as defined in claim 7, wherein the serial resonance circuit comprises a serial circuit of an inductance element and a capacitance element.

9. An antenna duplexing apparatus for a radio communication device as defined in claim 3, wherein the terminal impedance means comprises a parallel circuit of a resistance element and a capacitance element.

* * * * *